(12) United States Patent
Yao et al.

(10) Patent No.: US 12,044,325 B2
(45) Date of Patent: Jul. 23, 2024

(54) FAUCET STRUCTURE WITH A VALVE STRUCTURE AND MANUFACTURING METHOD FOR MANUFACTURING THE SAME

(71) Applicants: Hsiu-Te Yao, Kaohsiung (TW); I-Fang Cheng, Kaohsiung (TW)

(72) Inventors: Hsiu-Te Yao, Kaohsiung (TW); I-Fang Cheng, Kaohsiung (TW)

( * ) Notice: Subject to any disclaimer, the term of this patent is extended or adjusted under 35 U.S.C. 154(b) by 0 days.

(21) Appl. No.: 18/178,800

(22) Filed: Mar. 6, 2023

(65) Prior Publication Data
US 2023/0279962 A1    Sep. 7, 2023

(30) Foreign Application Priority Data
Mar. 7, 2022 (TW) .................. 111108238

(51) Int. Cl.
*E03C 1/04* (2006.01)
*F16K 11/00* (2006.01)
*F16K 31/60* (2006.01)

(52) U.S. Cl.
CPC .............. *F16K 19/006* (2013.01); *E03C 1/04* (2013.01); *F16K 31/60* (2013.01)

(58) Field of Classification Search
CPC .... F16K 19/006; F16K 31/60; F16K 11/0787; E03C 1/04
USPC ........................................................ 137/801
See application file for complete search history.

(56) References Cited

U.S. PATENT DOCUMENTS

| | | |
|---|---|---|
| 3,667,503 A | 6/1972 | Farrell et al. |
| 4,685,487 A | 8/1987 | Derdack et al. |
| 6,837,259 B2 * | 1/2005 | Lehner ............... F16K 11/0743 137/269 |
| 8,925,572 B2 | 1/2015 | Shih |
| 2020/0072362 A1 | 3/2020 | Hoogendoorn et al. |

FOREIGN PATENT DOCUMENTS

| | | |
|---|---|---|
| CN | 217272096 U | 8/2022 |
| DE | 3531935 C2 | 7/1995 |
| EP | 1046846 A1 | 10/2000 |
| ES | 2121507 A1 | 11/1998 |

OTHER PUBLICATIONS

European search report for the corresponding EP Appln. 23159190.0 issued at Aug. 8, 2023.

* cited by examiner

*Primary Examiner* — John Bastianelli
(74) *Attorney, Agent, or Firm* — Muncy, Geissler, Olds & Lowe, P.C.

(57) ABSTRACT

In the present disclosure, A cold waterway, a hot waterway and a mixing waterway and a main body are formed integrally in a valve structure, and a faucet structure has the valve structure, a valve core and a handle cover. The cold waterway, the hot waterway and the mixing waterway are formed in the main body by drilling the main body, such that the above three waterways and the main body are formed integrally. Then, an outlet is disposed to be connected to an annular waterway surrounding the main body, and the annular waterway outputs water to the outlet. Thus, it effectively solves the problems of water seepage caused by the tolerance between components or the long-term use of the valve core, and achieves the main advantages of effectively saving water by avoiding water seepage, and eliminating the need for gaskets to avoid poor sealing after aging.

9 Claims, 11 Drawing Sheets

```
┌─────────────────────────────────────────────┐
│ using a turning and milling manner to form the first │
│ accommodating space at the end of the main body, and to │──S1
│ form an annular groove outside the first accommodating │
│ space, wherein the inner tube wall is formed between the │
│ annular groove and the first accommodating space │
└─────────────────────────────────────────────┘
                        ▼
┌─────────────────────────────────────────────┐
│ forming the waterway assembly on a direction extending │
│ away from the first accommodating space, and using a │
│ drilling manner to drill the waterway assembly to form │──S2
│ the first waterway, the second waterway and the first │
│ mixing waterway, such that the first waterway, the │
│ second waterway and the first mixing waterway are │
│ exposed to the first accommodating space │
└─────────────────────────────────────────────┘
                        ▼
┌─────────────────────────────────────────────┐
│ using the drilling manner to drill the waterway assembly │
│ to form the second mixing waterway on a direction │
│ which the annular groove faces to the first mixing │──S3
│ waterway, wherein the second mixing waterway is │
│ communicative to the first mixing waterway │
└─────────────────────────────────────────────┘
                        ▼
┌─────────────────────────────────────────────┐
│ forming the outer tube wall surrounding outside of │
│ the annular groove, so as to make the annular │
│ groove form the annular waterway, wherein the │──S4
│ outer tube wall surrounds the annular groove by │
│ using a laser welding manner │
└─────────────────────────────────────────────┘
                        ▼
┌─────────────────────────────────────────────┐
│ using the drilling manner to drill the outer tube │──S5
│ wall to form the outlet │
└─────────────────────────────────────────────┘
```

```
┌─────────────────────────────────────────────────┐
│ using a turning and milling manner to form the  │
│ first accommodating space at the end of the     │
│ main body, and to form an annular groove        │──S1
│ outside the first accommodating space, wherein  │
│ the inner tube wall is formed between the       │
│ annular groove and the first accommodating space│
└─────────────────────────────────────────────────┘
                        ↓
┌─────────────────────────────────────────────────┐
│ forming the waterway assembly on a direction    │
│ extending away from the first accommodating     │
│ space, and using a drilling manner to drill the │
│ waterway assembly to form the first waterway,   │──S2
│ the second waterway and the first mixing        │
│ waterway, such that the first waterway, the     │
│ second waterway and the first mixing waterway   │
│ are exposed to the first accommodating space    │
└─────────────────────────────────────────────────┘
                        ↓                      ──S3
┌─────────────────────────────────────────────────┐
│ using the drilling manner to drill the waterway │
│ assembly to form the second mixing waterway on  │
│ a direction which the annular groove faces to   │
│ the first mixing waterway, wherein the second   │
│ mixing waterway is communicative to the first   │
│ mixing waterway                                 │
└─────────────────────────────────────────────────┘
                        ↓
┌─────────────────────────────────────────────────┐
│ forming the outer tube wall surrounding outside │
│ of the annular groove, so as to make the        │
│ annular groove form the annular waterway,       │──S4
│ wherein the outer tube wall surrounds the       │
│ annular groove by using a laser welding manner  │
└─────────────────────────────────────────────────┘
                        ↓
        ┌──────────────────────────────────┐
        │ using the drilling manner to     │──S5
        │ drill the outer tube wall to     │
        │ form the outlet                  │
        └──────────────────────────────────┘
                        ↓
     ┌──────────────────────────────────────┐
     │ using the welding manner to form the │──S6
     │ outlet pipe at periphery of the      │
     │ outlet after the outlet is formed    │
     └──────────────────────────────────────┘
                        ↓                    ──S7
     ┌──────────────────────────────────────┐
     │ performing a surface polishing       │
     │ process on the main body, the outer  │
     │ tube wall and the outlet pipe after  │
     │ the outlet pipe is formed            │
     └──────────────────────────────────────┘
```

Fig.11

FAUCET STRUCTURE WITH A VALVE STRUCTURE AND MANUFACTURING METHOD FOR MANUFACTURING THE SAME

BACKGROUND

Technical Field

The present disclosure relates to a faucet structure with a valve structure and a manufacturing method for manufacturing the same, and in particular to, a faucet structure with a valve structure and a manufacturing method for manufacturing the same which makes a cold waterway, a hot waterway, a mixing waterway and a main body are formed integrally in a valve structure.

Related Art

Regarding a conventional faucet structure, a top watersealing valve core is sleeved a to an accommodating space of a valve structure which is connected to a cold water tube and a hot water tube, wherein the top watersealing valve core can adjust a mixing ratio of cold and hot water via a handle core, thus the cold water and the hot water can be mixed in the accommodating space to generate warm water, and then an outlet can output the warm water to a user for washing or cleaning. The top watersealing valve core and the valve structure usually has O-ring therebetween, and the O-ring surrounds a gap of the watersealing valve core and the valve structure, so as to prevent clean water seepage from the gap between the top watersealing valve core and the valve structure. However, since the faucet structure is prepared by a machining process, the machining process often leaves some continuous errors, which often leads to relatively poor tolerances and the problem of water seepage. After the faucet is used for a long time, the O-ring will age and cause insufficient sealing, resulting in clean water seepage from the gap between the top watersealing valve core and the valve structure. Therefore, how to effectively solve the water seepage problem caused by the tolerance between components or the long-term use of the valve core by innovative hardware design, so as to truly achieve the purpose of saving water, is a subject that developers and researchers in related industries such as faucet structures need to make continuous efforts to overcome and solve.

SUMMARY

Today, the Applicant is in view of the fact that the conventional faucet structure still has many shortcomings in practical application, so the Applicant works hard to improve the conventional faucet structure with his or her rich professional knowledge and practical experience of years, and provides the present disclosure accordingly.

An objective of the present disclosure is to provide a valve structure and a manufacturing method for manufacturing the same, and in particular to, a faucet structure with a valve structure and a manufacturing method for manufacturing the same which makes a cold waterway, a hot waterway, a mixing waterway and a main body are formed integrally in a valve structure. In the present disclosure, the main body is formed with the cold cold waterway, the hot waterway, the mixing waterway therein by using a drilling manner, such that the three waterways and the main body made of stainless steel, copper, plastic steel, alloy or ceramic, are formed integrally in a valve structure. Then, an outlet is disposed to be connected to an annular waterway surrounding the main body, and the annular waterway outputs water to the outlet. Thus, it effectively solves the problems of water seepage caused by the tolerance between components or the long-term use of the valve core, and achieves the main advantages of effectively saving water by avoiding water seepage, and eliminating the need for gaskets to avoid poor sealing after aging.

To achieve the above objective of the present disclosure, the present disclosure provides a valve structure, which comprises a main body, a waterway assembly and an outer tube wall. The main body has first accommodating space, an annular waterway and an inner tube wall, wherein the first accommodating space is formed at and opened to an end of the main body, the annular waterway surrounds outside the first accommodating space, and the inner tube wall is formed between the annular waterway and the first accommodating space. The waterway assembly is disposed in the main body, and has a first waterway, a second waterway, a first mixing waterway and second mixing waterway, wherein the first waterway, the second waterway and the first mixing waterway are exposed to the first accommodating space, and the second mixing waterway is connected to the first mixing waterway and annular waterway. The outer tube wall surrounds outside of the annular waterway, and has an outlet which is connected to the annular waterway and opened to the outer tube wall.

According to the above valve structure, the annular waterway has an inner surface and the main body has a first outer surface, wherein the inner surface shrinks from the first outer surface towards the first accommodating space.

According to the above valve structure, the outer tube wall has a second outer surface, and the second outer surface is coplanar with the first outer surface of the main body.

According to the above valve structure, the inner tube wall has a first width, the annular waterway has second width, and outer tube wall has a third width.

According to the above valve structure, the second width is larger than a third width.

According to the above valve structure, the third width is larger than a second width.

According to the above valve structure, a ratio of a total width of the inner tube wall, the annular waterway and the outer tube wall over a second width of the annular waterway is 1:0.1 to 1:0.5.

According to the above valve structure, the first waterway, the second waterway and the first mixing waterway are arranged in a triangle in the first accommodating space.

According to the above valve structure, the waterway assembly further comprises a first tube way, wherein the first tube way is connected to a first external water source.

According to the above valve structure, the first waterway is a cold water way, the first external water source is an external cold water source, and the first tube way is a cold water tube way for transmitting the external cold water source.

According to the above valve structure, the waterway assembly further comprises a second tube way, wherein the second tube way is connected to a second external water source.

According to the above valve structure, the second waterway is a hot water way, the second external water source is an external hot water source, and the second tube way is a hot water tube way for transmitting the external hot water source.

According to the above valve structure, the main body has a second accommodating space which is located at and opened to another end of the main body away from the first accommodating space.

According to the above valve structure, the first tube way is disposed in the second accommodating space.

According to the above valve structure, the second tube way is disposed in the second accommodating space.

According to the above valve structure, the valve structure further comprises an outlet pipe disposed at the outlet.

To achieve implementation of the above valve structure, the present disclosure provides a manufacturing method for manufacturing the valve structure, and the manufacturing method for manufacturing the valve structure comprises the following steps. Firstly, at a first step, a turning and milling manner is used to form the first accommodating space at the end of the main body, and to form an annular groove outside the first accommodating space, wherein the inner tube wall is formed between the annular groove and the first accommodating space. At a second step, the waterway assembly is formed on a direction extending away from the first accommodating space, and a drilling manner is used to drill the waterway assembly to form the first waterway, the second waterway and the first mixing waterway, such that the first waterway, the second waterway and the first mixing waterway are exposed to the first accommodating space. At a third step, the drilling manner is used to drill the waterway assembly to form the second mixing waterway on a direction which the annular groove faces to the first mixing waterway, wherein the second mixing waterway is communicative to the first mixing waterway. At a fourth step, the outer tube wall surrounding outside of the annular groove is formed, so as to make the annular groove form the annular waterway, wherein the outer tube wall surrounds the annular groove by using a welding manner. At a fifth step, the drilling manner is used to drill the outer tube wall to form the outlet.

According to the manufacturing method for manufacturing the valve structure, the turning and milling manner is to use a computer numerical control (CNC) turning and milling device to implement lathing and milling.

According to the manufacturing method for manufacturing the valve structure, the first waterway, the second waterway and the first mixing waterway are arranged in a triangle in the first accommodating space.

According to the manufacturing method for manufacturing the valve structure, at the fourth step, before the outer tube wall is formed, a first tube way at an end of the first waterway away from the first accommodating space is formed, wherein the first tube way is connected to a first external water source.

According to the manufacturing method for manufacturing the valve structure, at the fourth step, before the outer tube wall is formed, a second tube way at an end of the second waterway away from the first accommodating space is formed, wherein the second tube way is connected to a second external water source.

According to the manufacturing method for manufacturing the valve structure, at the fourth step, before the outer tube wall is formed, a second accommodating space which is located at and opened to another end of the main body away from the first accommodating space is formed.

According to the manufacturing method for manufacturing the valve structure, the first tube way is disposed in the second accommodating space.

According to the manufacturing method for manufacturing the valve structure, the second tube way is disposed in the second accommodating space.

To achieve the above objective of the present disclosure, the present disclosure further provides a faucet structure with the valve structure, which comprises the above valve structure, a valve core and a handle cover. The valve core is disposed in the first accommodating space of the valve structure, wherein an end of the valve core away from the valve structure has a handle core. The handle cover is sleeved on the handle core of the valve core.

According to the faucet structure with the valve structure, the main body of the valve structure further has at least two positioning holes, and the positioning holes are exposed to the first accommodating space.

According to the faucet structure with the valve structure, the valve core further has two positioning parts to engage into the positioning holes.

According to the faucet structure with the valve structure, the handle cover is extended to form a handle.

To achieve implementation of the above faucet structure, the present disclosure provides a manufacturing method for manufacturing the faucet structure with the valve structure, which comprises steps as follows. Firstly, at a first step, a turning and milling manner is used to form the first accommodating space at the end of the main body, and to form an annular groove outside the first accommodating space, wherein the inner tube wall is formed between the annular groove and the first accommodating space. At a second step, the waterway assembly is formed on a direction extending away from the first accommodating space, and a drilling manner is used to drill the waterway assembly to form the first waterway, the second waterway and the first mixing waterway, such that the first waterway, the second waterway and the first mixing waterway are exposed to the first accommodating space. At a third step, the drilling manner is used to drill the waterway assembly to form the second mixing waterway on a direction which the annular groove faces to the first mixing waterway, wherein the second mixing waterway is communicative to the first mixing waterway. At a fourth step, the outer tube wall surrounding outside of the annular groove is formed, so as to make the annular groove form the annular waterway, wherein the outer tube wall surrounds the annular groove by using a welding manner. At a fifth step, the drilling manner is used to drill the outer tube wall to form the outlet. At a sixth step, the welding manner is used to form the outlet pipe at periphery of the outlet after the outlet is formed. At a seventh step, a surface polishing process is processed on the main body, the outer tube wall and the outlet pipe after the outlet pipe is formed.

According to the manufacturing method for manufacturing the faucet structure with the valve structure, the turning and milling manner is to use a computer numerical control (CNC) turning and milling device to implement lathing and milling.

According to the manufacturing method for manufacturing the faucet structure with the valve structure, the first waterway, the second waterway, the first mixing waterway, the second mixing waterway and the outlet are formed by using the drilling manner.

According to the manufacturing method for manufacturing the faucet structure with the valve structure, the first waterway, the second waterway and the first mixing waterway are arranged in a triangle in the first accommodating space.

According to the manufacturing method for manufacturing the faucet structure with the valve structure, before the outer tube wall is formed, a first tube way at an end of the first waterway away from the first accommodating space is formed, wherein the first tube way is connected to a first external water source According to the manufacturing method for manufacturing the faucet structure with the valve structure, before the outer tube wall is formed, a second tube way at an end of the second waterway away from the first accommodating space is formed, wherein the second tube way is connected to a second external water source.

According to the manufacturing method for manufacturing the faucet structure with the valve structure, before the outer tube wall is formed, a second accommodating space which is located at and opened to another end of the main body away from the first accommodating space is formed.

According to the manufacturing method for manufacturing the faucet structure with the valve structure, the first tube way is disposed in the second accommodating space.

According to the manufacturing method for manufacturing the faucet structure with the valve structure, the second tube way is disposed in the second accommodating space.

According to the manufacturing method for manufacturing the faucet structure with the valve structure, the outlet pipe is formed at the outlet by using the welding manner.

According to the manufacturing method for manufacturing the faucet structure with the valve structure, after the surface polishing process is performed, the valve core having the handle core is disposed in the first accommodating space.

According to the manufacturing method for manufacturing the faucet structure with the valve structure, the handle cover with a handle is sleeved on the handle core of the valve core.

To sum up, regarding the faucet structure with a valve structure and the manufacturing method for manufacturing the same, the cold waterway for outputting the cold water, the hot waterway for outputting the hot water, the mixing waterway for outputting the warm water and the main body are formed integrally in a valve structure by using the drill manner, such that the three waterways and the main body are formed integrally in a valve structure. Then, an outlet is disposed to be connected to an annular waterway surrounding the main body, and the annular waterway outputs water to the outlet. Thus, it effectively solves the problems of water seepage caused by the tolerance between components or the long-term use of the valve core, and achieves the main advantages of effectively saving water by avoiding water seepage, and eliminating the need for gaskets to avoid poor sealing after aging.

DETAILS OF EXEMPLARY EMBODIMENTS

The following description is of the best-contemplated mode for realizing the present disclosure. This description is made for the purpose of illustrating the general principles of the present disclosure and should not be taken in a limiting sense. The scope of the present disclosure is best determined by reference to the appended claims.

Figure 1:
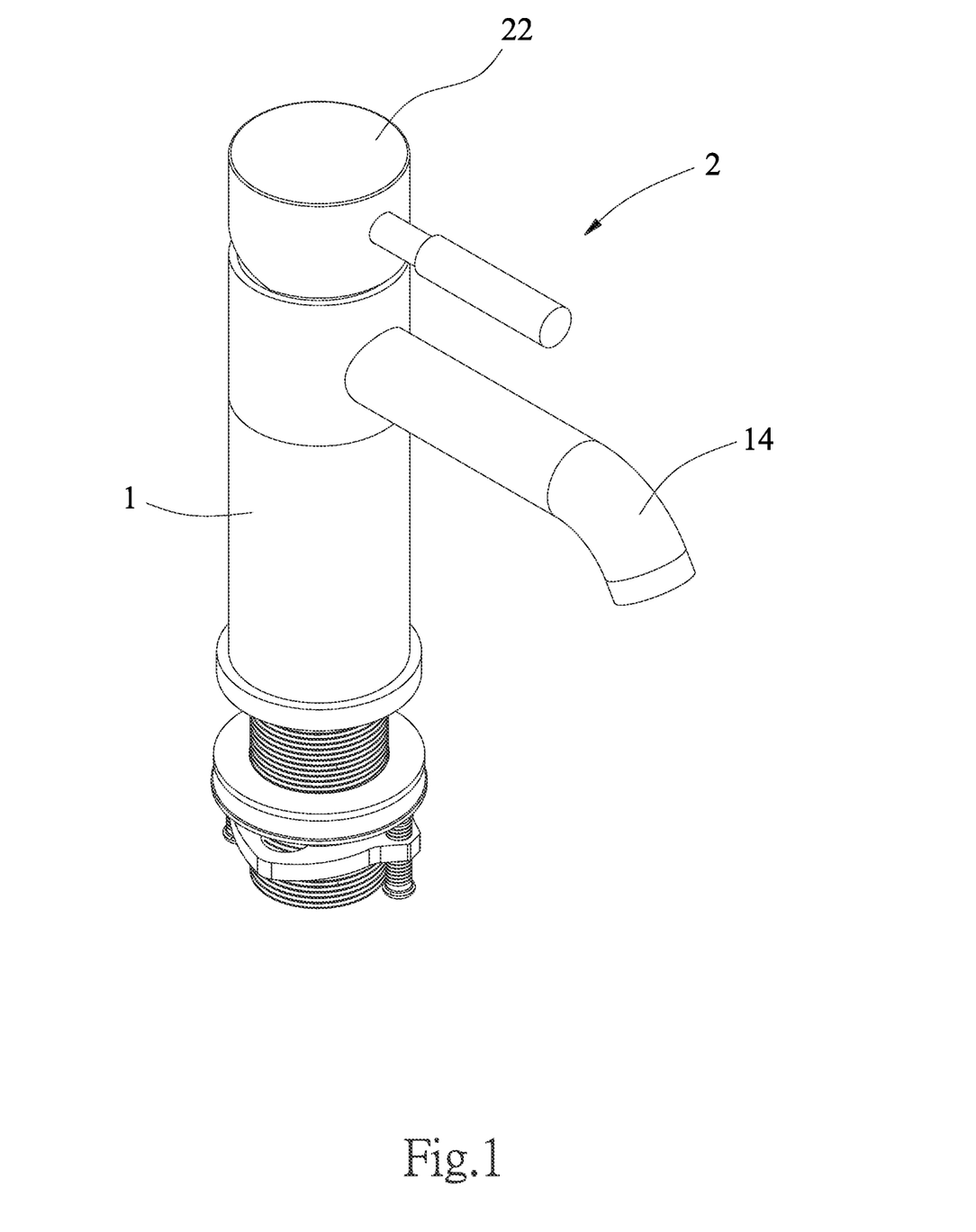
FIG. 1 is a schematic diagram showing a whole structure of a faucet structure with a valve structure according to an embodiment of the present disclosure.
Figure 2:
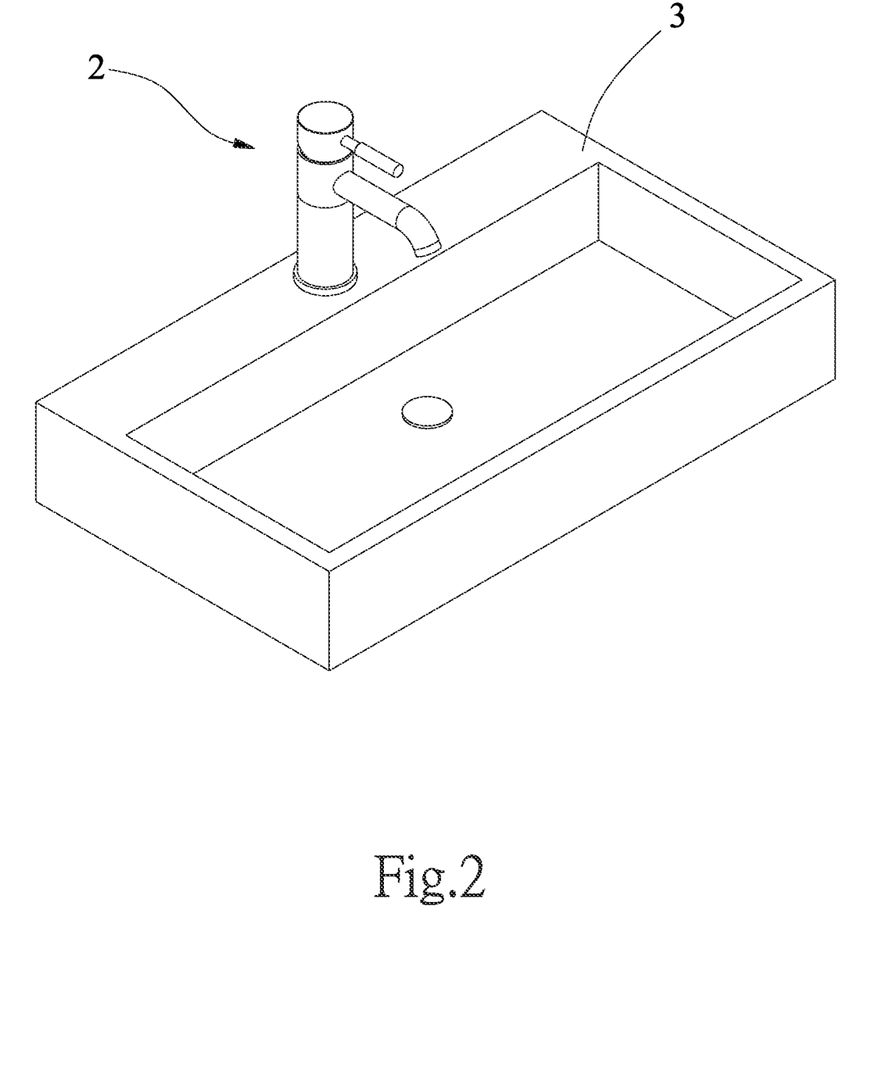
FIG. 2 is a schematic diagram showing a usage of a faucet structure with a valve structure according to an embodiment of the present disclosure.

Firstly, refer to FIG. 1 and FIG. 2, FIG. 1 is a schematic diagram showing a whole structure of a faucet structure with a valve structure according to an embodiment of the present disclosure, and FIG. 2 is a schematic diagram showing a usage of a faucet structure with a valve structure according to an embodiment of the present disclosure. The faucet structure with valve the structure (1) at least comprises a valve structure (1), a valve core (21) and a handle cover (22). The valve structure (1) comprises a main body (11), a waterway assembly (12) and an outer tube wall (13), wherein the faucet structure with the valve structure (1) can be, for example, mounted on a wash basin (3), such that a user can use the faucet structure with the valve structure (1) for washing or cleaning. In the present disclosure, the main body (11) is formed with the cold cold waterway, the hot waterway, the mixing waterway therein by using a drilling manner, such that the three waterways and the main body (11) made of stainless steel, copper, plastic steel, alloy or ceramic, are formed integrally in a valve structure (1). Then, an outlet (131) is disposed to be connected to an annular waterway (112) surrounding the main body (11), and the annular waterway (112) outputs water to the outlet (131). Thus, it effectively solves the problems of water seepage caused by the tolerance between components or the long-term use of the valve core (21), and achieves the main advantages of effectively saving water by avoiding water seepage, and eliminating the need for gaskets to avoid poor sealing after aging.

Figure 3:
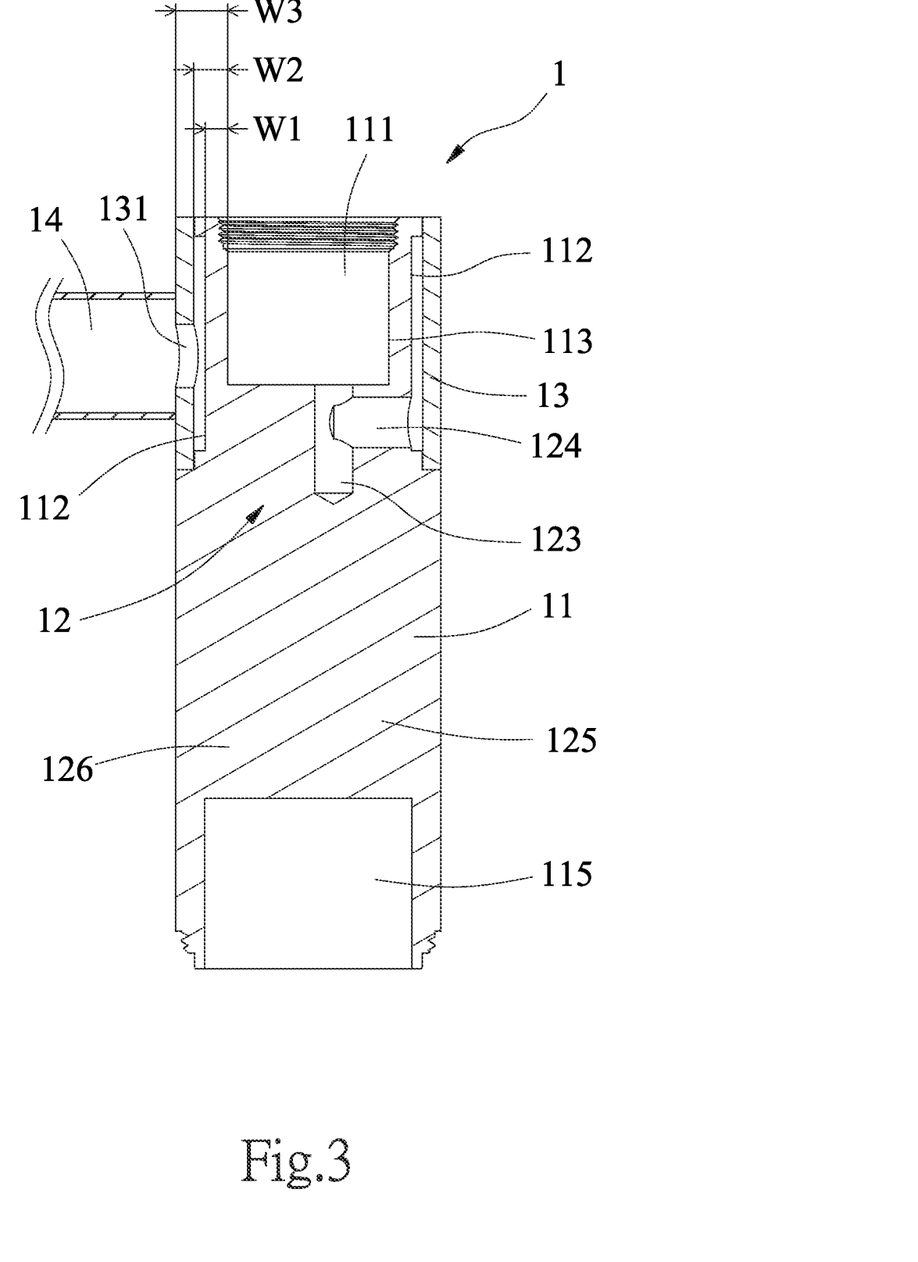
FIG. 3 is a sectional view of a whole structure of a valve structure according to an embodiment of the present disclosure.
Figure 4:
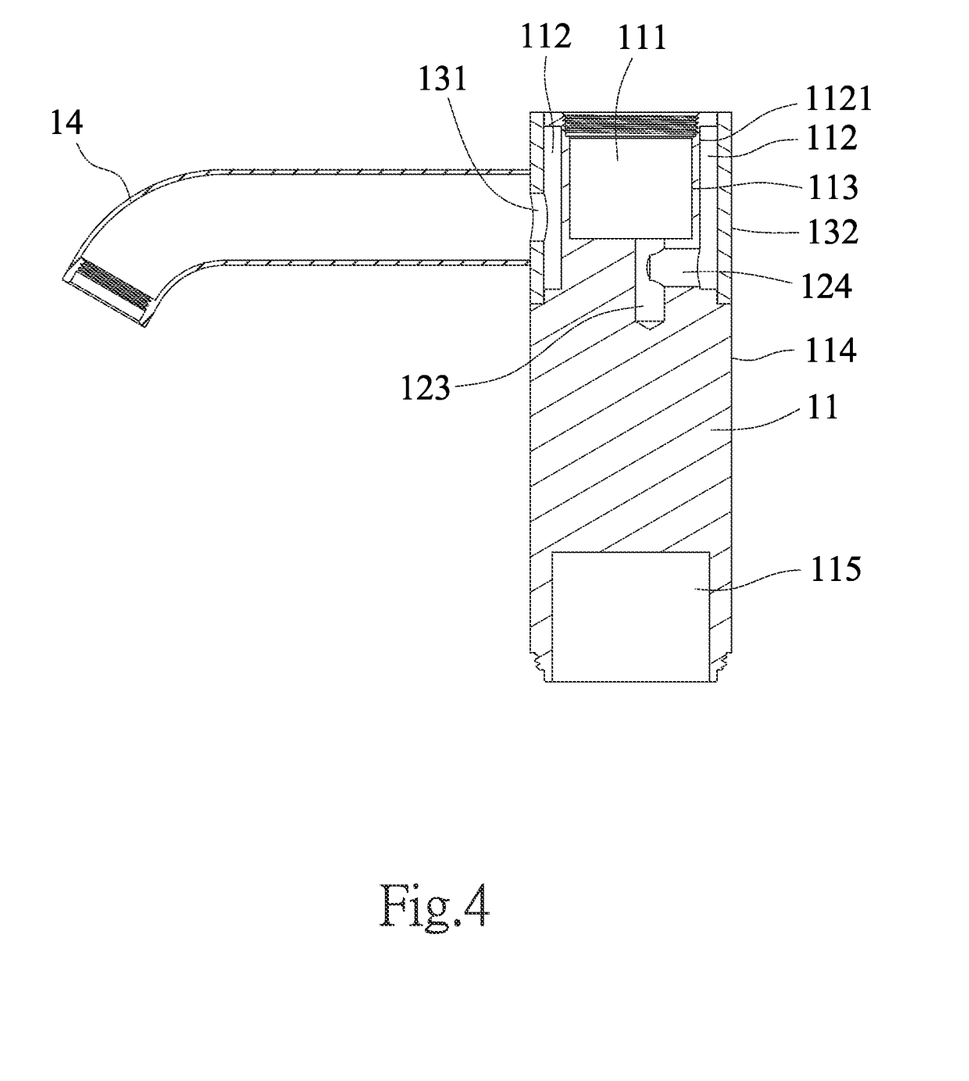
FIG. 4 is another one sectional view of a whole structure of a valve structure according to an embodiment of the present disclosure.
Figure 5:
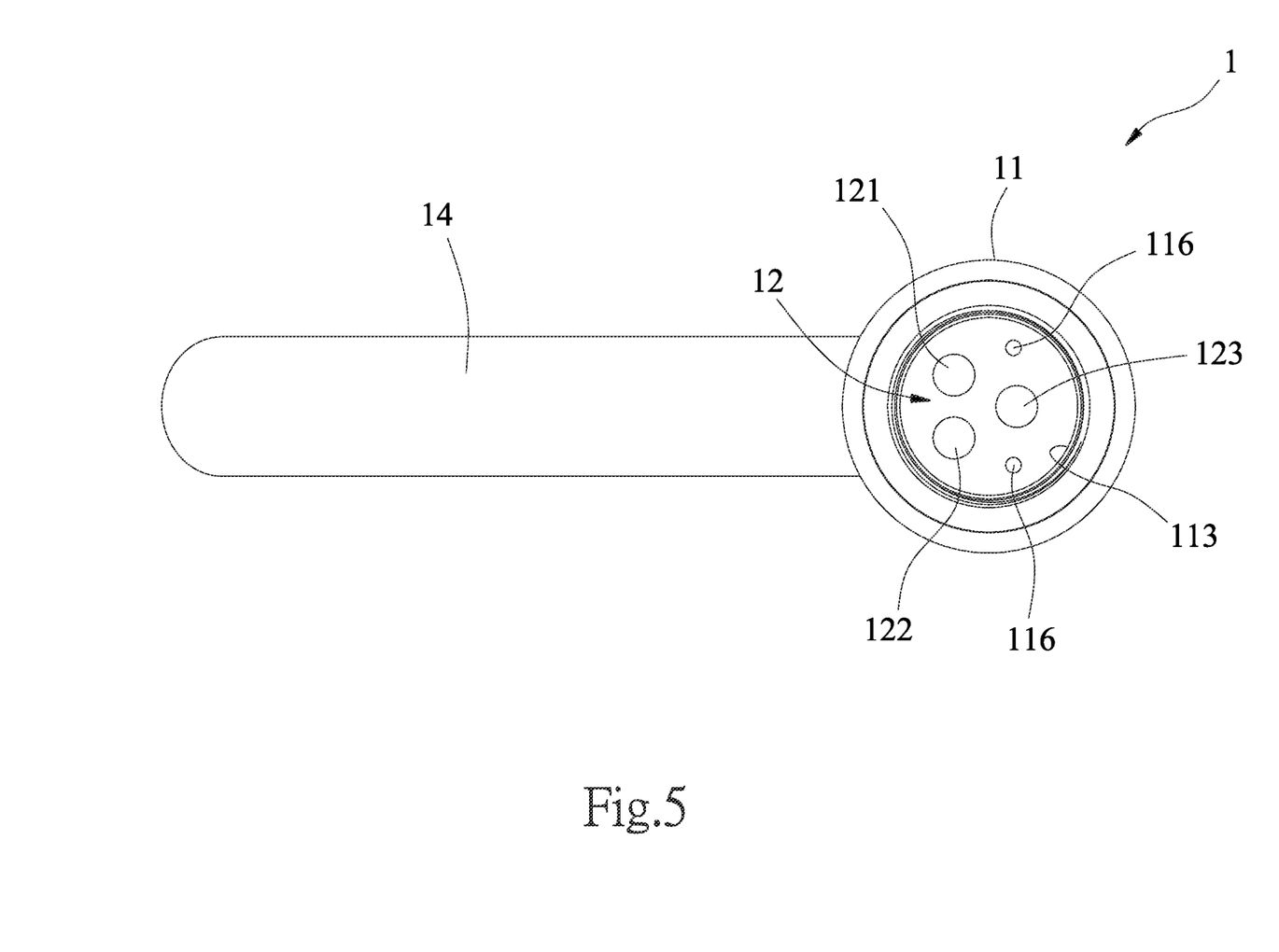
FIG. 5 is a top view of a whole structure of a valve structure according to an embodiment of the present disclosure.
Figure 6:
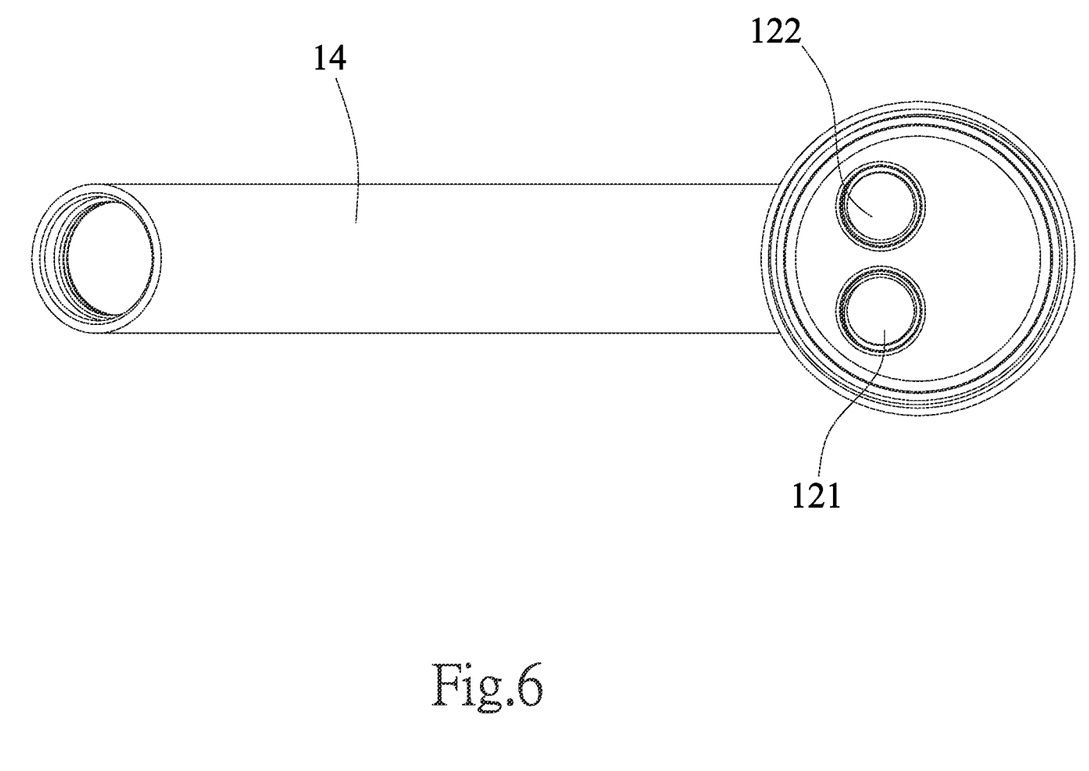
FIG. 6 is a bottom view of a whole structure of a valve structure according to an embodiment of the present disclosure.

Refer to FIG. 3 to FIG. 6, FIG. 3 is a sectional view of a whole structure of a valve structure according to an embodiment of the present disclosure, FIG. 4 is another one sectional view of a whole structure of a valve structure according to an embodiment of the present disclosure, FIG. 5 is a top view of a whole structure of a valve structure according to an embodiment of the present disclosure, and FIG. 6 is a bottom view of a whole structure of a valve structure according to an embodiment of the present disclosure. The main body (11) made of stainless steel, copper, plastic steel, alloy or ceramic comprises a first accommodating space (111), an annular waterway (112) and an inner tube wall (113). The first accommodating space (111) is disposed at an end of the main body (11), the annular waterway (112) surrounds outside of the first accommodating space (111), and the inner tube wall (113) is disposed between the annular waterway (112) and the first accommodating space (111). The inner tube wall (113) has a first width (W1), and the annular waterway (112) has a second width (W2). The annular waterway (112) further has an inner surface (1121), and the main body (11) has a first outer surface (114), wherein the inner surface (1121) shrinks from the first outer surface (112) towards the first accommodating space (111).

The waterway assembly (12) is disposed in the main body (11), and the waterway assembly (12) comprises a first waterway (121), a second waterway (122), a first mixing waterway (123) and second mixing waterway (124), wherein the first waterway (121) is a cold waterway, the second waterway (122) is a hot waterway, and the first mixing waterway (123) and the second mixing waterway (124) are used to mix the hot and cold water, that is, they are warm waterway. The first tube way (125) is connected to the first waterway (121) and a first external water source, and the first external water source is an external cold water source, that is, the first tube way (125) is used to transmit the cold water source. The second tube way (126) is a second external water source connected to the second waterway (122), and the second external water source is an external hot water source, that is, the second tube way (126) is used to transmit the hot water source. The first waterway (121), the second waterway (122) and the first mixing waterway (123) are exposed to the first accommodating space (111), and are arranged in a triangle. The second mixing waterway (124) is connected to the first mixing waterway (123) and annular waterway (112), i.e., the second mixing waterway (124) is arranged to be vertical to the first mixing waterway (123) and the annular waterway (112). In other words, in an embodiment of the present disclosure, the first tube way (125) and the second tube way (126) are buried in the main body (11), and respectively connected to the first waterway (121) and the second waterway (122). The cold water from the first waterway (121) and the hot water from the second waterway (122) are mixed in the first accommodating space (111), then the first mixing waterway (123) transmits the mixed water to the second mixing waterway (124), and finally the mixed water flows into the annular waterway (112).

Figure 7:
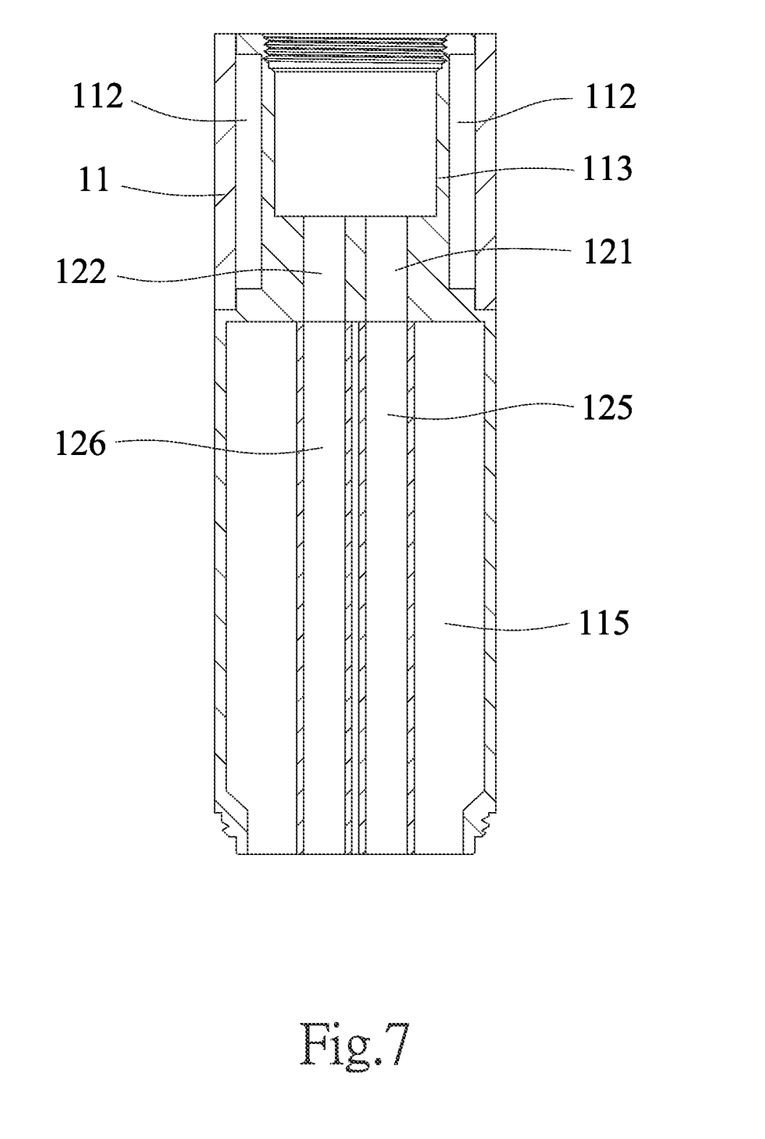
FIG. 7 is a sectional view of a whole structure of a valve structure according to another one embodiment of the present disclosure.

Refer to FIG. 7 with other drawings at the same time, and FIG. 7 is a sectional view of a whole structure of a valve structure according to another one embodiment of the present disclosure. A second accommodating space (115) is formed at and opened to another end of the main body (11) away from the first accommodating space (111), and the second accommodating space (115) is hollow. The first tube way (125) and the second tube way (126) are disposed in the second accommodating space (115), and are respectively connected to the first waterway (121) and the second waterway (122). The cold water from the first waterway (121) and the hot water from the second waterway (122) are mixed in the first accommodating space (111), then the first mixing waterway (123) transmits the mixed water to the second mixing waterway (124), and finally the mixed water flows into the annular waterway (112).

The outer tube wall (13) surrounds outside of the annular waterway (112), and an outlet (131) is formed to be connected to the annular waterway (112) and opened to the outer tube wall (13). The outer tube wall (13) has a second outer surface (132), and the second outer surface (132) is coplanar with the first outer surface (114) of the main body (11). Further, the outer tube wall (13) has a third width (W3), wherein the third width (W3) is larger than the second width (W2) of an annular waterway (112), or the third width (W3) is less than the second width (W2) of an annular waterway (112). Further, a ratio of a total width (W1+W2+W3) of the inner tube wall (113), the annular waterway (112) and the outer tube wall (13) over the second width (W2) of an annular waterway (112) is 1:0.1 to 1:0.5, and preferably, 1:0.2. That is, the second width (W2) is for example 0.2 cm, the total width (W1+W2+W3) of the inner tube wall (113), the annular waterway (112) and the outer tube wall (13) is 1 cm, and the present disclosure is not limited thereto. Further, the outlet (131) further has an outlet pipe (14), wherein the water flowing through the first mixing waterway (123) and the second mixing waterway (124) enters the annular waterway (112), then the water will flow to the outlet pipe (14) via the outlet (131), and another end of the outlet pipe (14) outputs the water.

Figure 8:
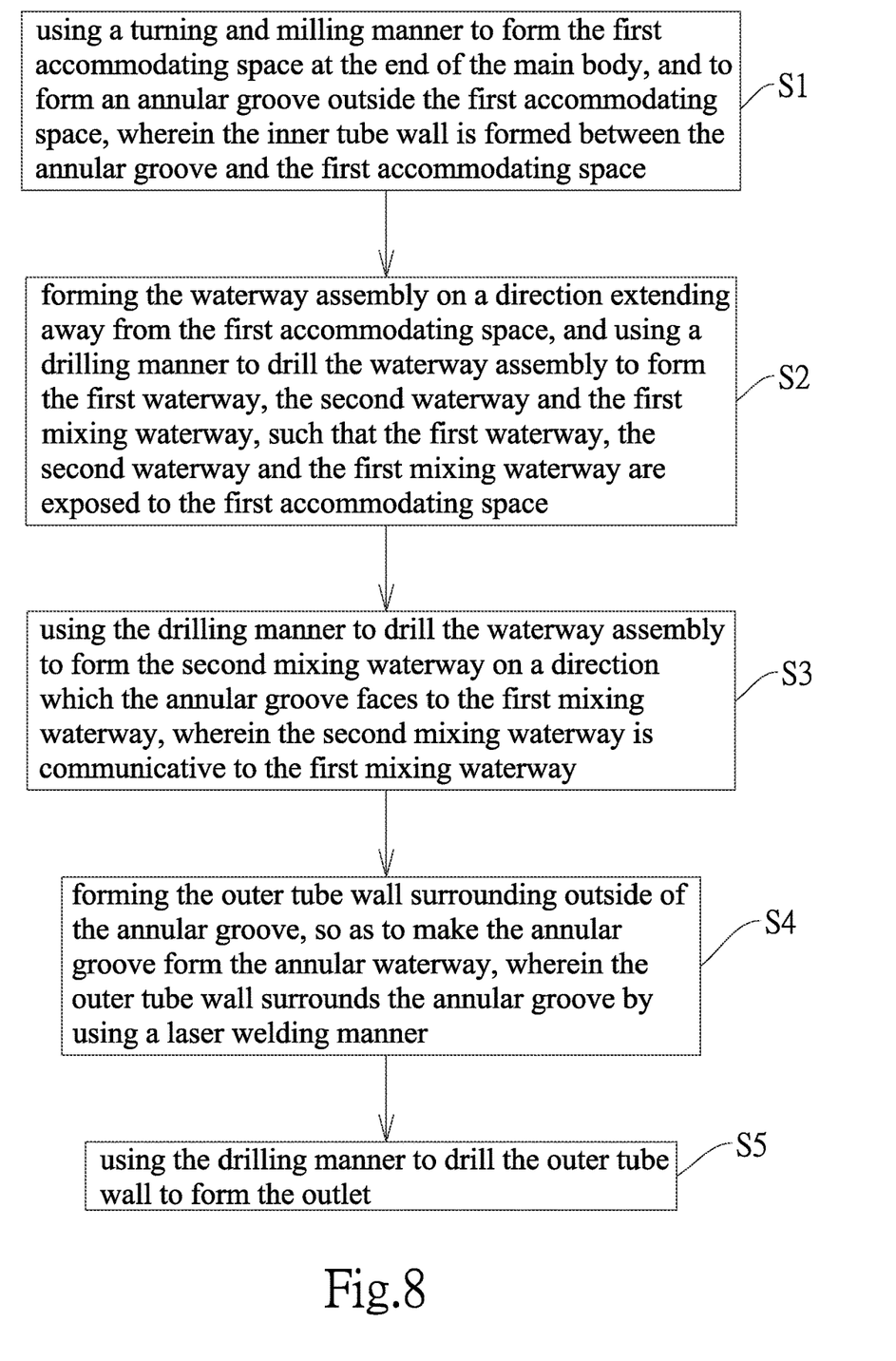
FIG. 8 is a flow chart of a manufacturing method for manufacturing a valve structure according to an embodiment of the present disclosure.

Further, to make the person with the ordinary skill in the art to clearly and entirely understand details of the present disclosure, please refer to FIG. 8, and FIG. 8 is a flow chart of a manufacturing method for manufacturing a valve structure according to an embodiment of the present disclosure. The manufacturing method for manufacturing the valve structure comprises the following steps (S1 to S5).

At a first step (S1), a turning and milling manner is used to form the first accommodating space (111) at the end of the main body (11), and to form an annular groove outside the first accommodating space (111), wherein the inner tube wall (113) is formed between the annular groove and the first accommodating space (111). To be specifically, the turning and milling manner is to use a computer numerical control (CNC) turning and milling device to implement lathing and milling. Also refer to FIG. 3 and FIG. 4, the main body (11) made of stainless steel, copper, plastic steel, alloy or ceramic, the CNC turning and milling device is used to remove the end of the main body (11) to form the accommodating space (111), and then the CNC turning and milling device is used to remove circular periphery outside the first accommodating space (111) to the annular groove.

At a second step (S2), the waterway assembly (12) is formed on a direction extending away from the first accommodating space (111), and a drilling manner is used to drill the waterway assembly (12) to form the first waterway (121), the second waterway (122) and the first mixing waterway (123), such that the first waterway (121), the second waterway (122) and the first mixing waterway (123) are exposed to the first accommodating space (111). Also refer to FIG. 5 and FIG. 6, the first waterway (121), the second waterway (122) and the first mixing waterway (123) are formed by drilling the main body (11) from the first accommodating space (111) along the direction extending away from the first accommodating space (111), and the first waterway (121), the second waterway (122) and the first mixing waterway (123) are arranged in a triangle. In a preferred embodiment of the present disclosure, the first waterway (121) is a cold waterway, and the second waterway (122) is a hot waterway.

At a third step (S3), the drilling manner is used to drill the waterway assembly (12) to form the second mixing waterway (124) on a direction which the annular groove faces to the first mixing waterway (123), wherein the second mixing waterway (124) is communicative to the first mixing waterway (123). Also refer to FIG. 3 and FIG. 4, similar to the formation of the first waterway (121), the second waterway (122) and the first mixing waterway (123), the drilling manner is used to drill the main body (11), and the second mixing waterway (124) is formed between the first mixing waterway (123) and the annular groove, and connected to the first mixing waterway (123) and the annular groove. Further, the second mixing waterway (124) and the first mixing waterway (123) are vertical to each other. Moreover, after the second mixing waterway (124) is formed and before the outer tube wall (13) is formed, a first tube way (125) is formed at an end of the first waterway (121) away from the first accommodating space (111), and a second tube way (126) is formed at an end of the second waterway (122) away from the first accommodating space (111), wherein the first tube way (125) is connected to a first external water source, and the second tube way (126) is connected to a second external water source. In a preferred embodiment, the first external water source is an external cold water source, and the first tube way (125) is used to transmit the cold water source; the second external water source is an external hot water source, and the second tube way (126) is used to transmit the hot water source. In a preferred embodiment, the first tube way (125) and the second tube way (126) can be buried in the main body (11), and are respectively connected to the first waterway (121) and the second waterway (122). The cold water and the hot water respectively from the first waterway (121) and the second waterway (122) is mixed in the first accommodating space (111), and then the mixed water flows to the second mixing waterway (124) via the first mixing waterway (123). Also refer to FIG. 7, the end of the main body (11) away from the first accommodating space (111) is formed with the second accommodating space (115) being hollowed and opened to the end of the main body (11), and the first tube way (125) and the second tube way (126) are disposed in the second accommodating space (115) and respectively connected to the first waterway (121) and the second waterway (122). The cold water and the hot water respectively from the first waterway (121) and the second waterway (122) is mixed in the first accommodating space (111), and then the mixed water flows to the second mixing waterway (124) via the first mixing waterway (123).

At a fourth step (S4), the outer tube wall (13) surrounding outside of the annular groove is formed, so as to make the annular groove form the annular waterway (112), wherein the outer tube wall (13) surrounds the annular groove by using a welding manner. Specifically, the welding manner can be gas welding, resistance welding, arc welding, induction welding and laser welding, butt welding or seed welding, and the present disclosure is not limited thereto. Further refer to FIG. 3 and FIG. 4, and the outer tube wall (13) being circular surrounds the annular groove by using the laser welding, such that the annular groove forms the annular waterway (112) being closed but communicative to the second mixing waterway (124), and the mixed water of the cold water and the hot water, coming from the second mixing waterway (124), flows in the annular waterway (112).

At a fifth step (S5), the drilling manner is used to drill the outer tube wall (13) to form the outlet (131). Refer to FIG. 3 and FIG. 4 again, and the outer tube wall (13) is drilled to form the outlet (131), such that the mixed water from the annular waterway (112) can flow outside via the outlet (131).

Further, after the outlet (131) is formed, the outlet (131) is disposed with an outlet pipe (14) by using the welding manner, and the mixed water from the outlet (131) can flow outside via the outlet pipe (14). Specifically, the welding manner can be gas welding, resistance welding, arc welding, induction welding and laser welding, butt welding or seed welding, and the present disclosure is not limited thereto.

Figure 9:
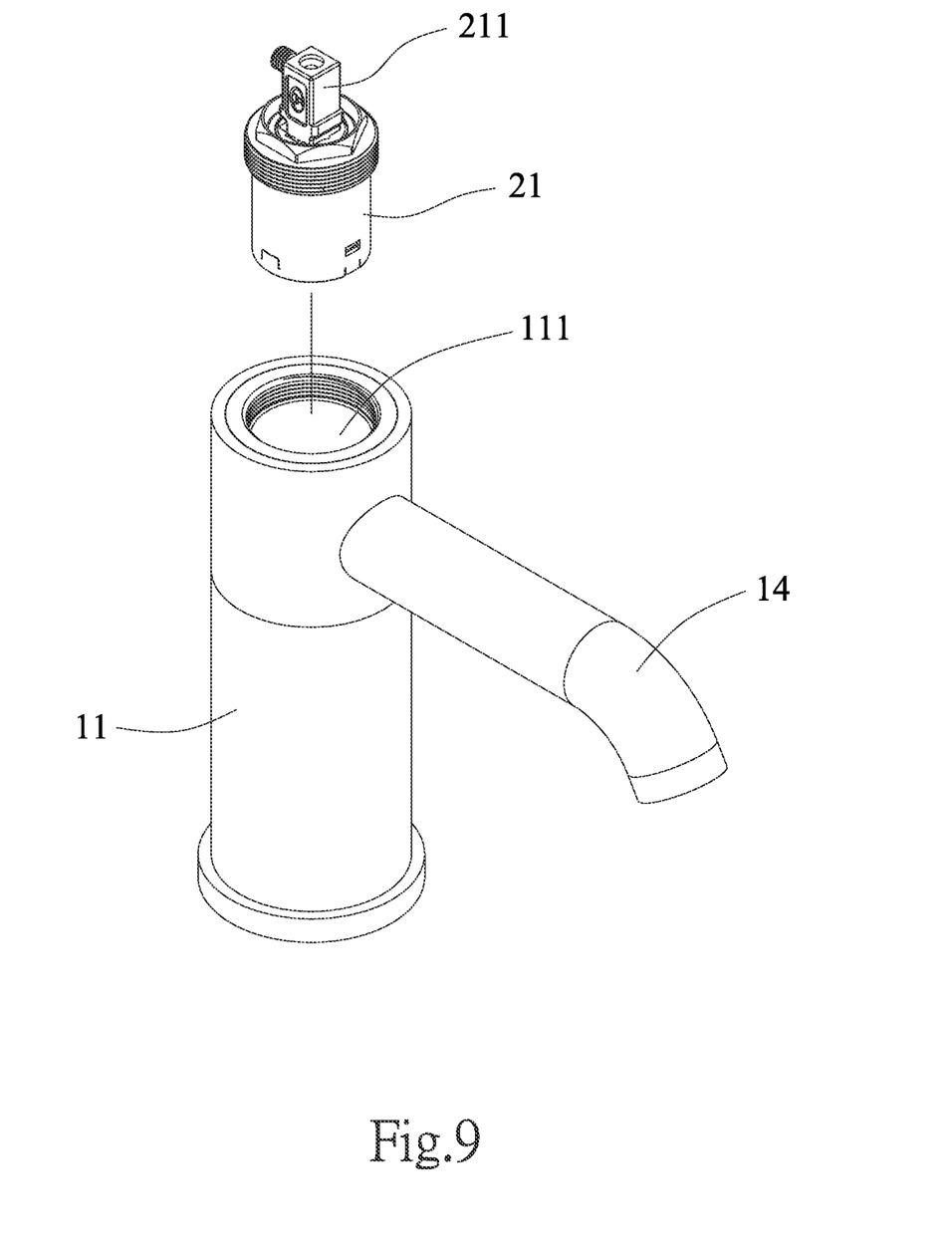
FIG. 9 is a schematic diagram showing assembling of a valve core of a faucet structure with a valve structure according to an embodiment of the present disclosure.

In an embodiment of the present disclosure, the valve core (21) is disposed in the first accommodating space (111) of the valve structure (1), and an end of the valve core (21) away from the valve structure (1) has a handle core (211). Refer to FIG. 5 and FIG. 9, and FIG. 9 is a schematic diagram showing assembling of a valve core of a faucet structure with a valve structure according to an embodiment of the present disclosure. The main body (11) of the valve structure (1) further has at least two positioning holes (116), the positioning holes (116) are exposed to the first accommodating space (111), and the valve core (21) further has two positioning parts to engage into the positioning holes (116). The valve core (21) can be installed in the first accommodating space (111) of the valve structure (1) by making the two positioning parts engage into the positioning holes (116). The handle core (211) can be used to adjust a mixing ratio of the cold water from the first waterway (121) and the hot water from the second waterway (122), and then the mixed water of the cold water and the hot water will be output by the outlet pipe (14).

Figure 10:
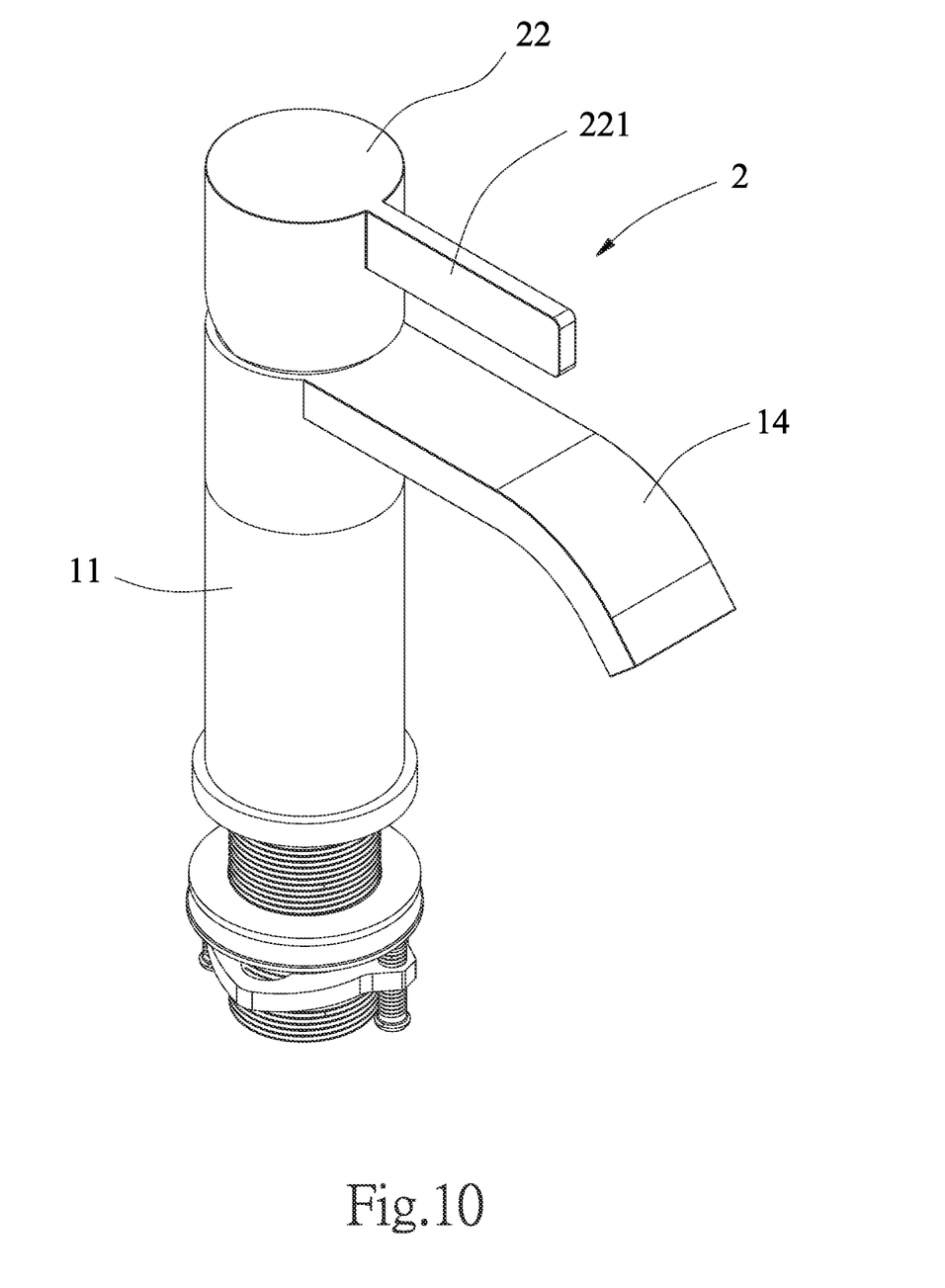
FIG. 10 is a schematic diagram showing assembling of a handle cover of a faucet structure with a valve structure according to an embodiment of the present disclosure.

Refer to FIG. 10, and FIG. 10 is a schematic diagram showing assembling of a handle cover of a faucet structure with a valve structure according to an embodiment of the present disclosure. The handle cover (22) is sleeved on the handle core (211) of the valve core (21) and used to control the handle core (211), such that mixing ratio of the cold water from the first waterway (121) and the hot water from the second waterway (122) can be adjusted. The handle cover (22) is extended to form a handle (221), and thus the user can easily control the handle cover (22) and the valve core (21) by operating the handle (221).

Refer to FIG. 9 and FIG. 10, and the outlet pipe (14) disposed at outside of the outlet (131) can be any shape, for example, a cycle or flat shape, and the present disclosure is not limited thereto. It is noted that, the shape of the outlet pipe (14) do not affect the implementation of the present disclosure while the outlet pipe (14) can successfully output the mixed water of the cold water from the first waterway (121) and the hot water from the second waterway (122).

Figure 11:
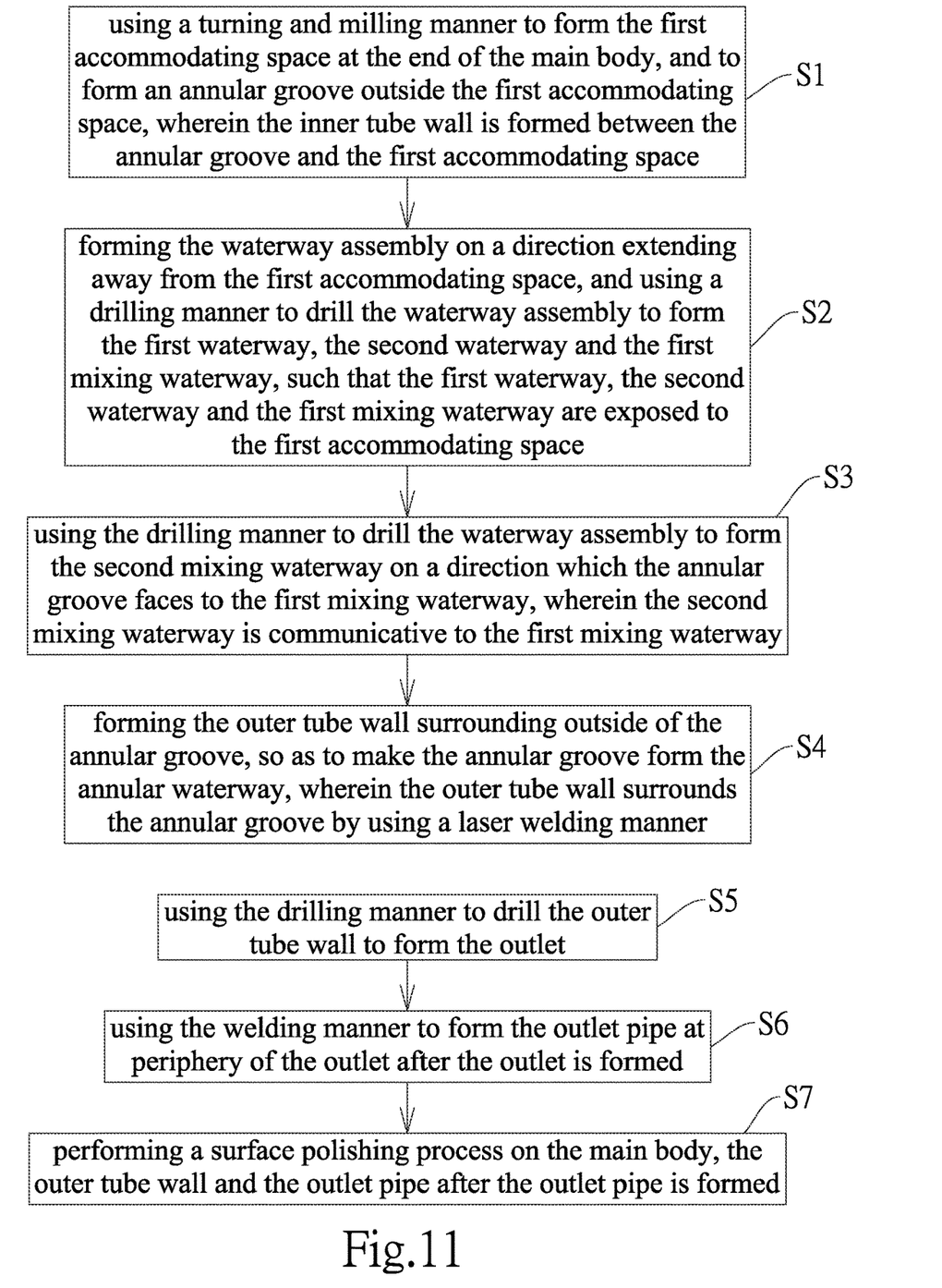
FIG. 11 is a flow chart of a manufacturing method for manufacturing a faucet structure with a valve structure according to an embodiment of the present disclosure.

Further, to make the person with the ordinary skill in the art to clearly and entirely understand details of the present disclosure, please refer to FIG. 11, and FIG. 11 is a flow chart of a manufacturing method for manufacturing a faucet structure with a valve structure according to an embodiment of the present disclosure. The manufacturing method for manufacturing the faucet structure with the valve structure comprises the following steps (S1 to S7).

At a first step (S1), a turning and milling manner is used to form the first accommodating space (111) at the end of the main body (11), and to form an annular groove outside the first accommodating space (111), wherein the inner tube wall (113) is formed between the annular groove and the first accommodating space (111). To be specifically, the turning and milling manner is to use a computer numerical control (CNC) turning and milling device to implement lathing and milling.

At a second step (S2), the waterway assembly (12) is formed on a direction extending away from the first accommodating space (111), and a drilling manner is used to drill the waterway assembly (12) to form the first waterway (121), the second waterway (122) and the first mixing waterway (123), such that the first waterway (121), the second waterway (122) and the first mixing waterway (123) are exposed to the first accommodating space (111).

At a third step (S3), the drilling manner is used to drill the waterway assembly (12) to form the second mixing waterway (124) on a direction which the annular groove faces to the first mixing waterway (123), wherein the second mixing waterway (124) is communicative to the first mixing waterway (123).

At a fourth step (S4), the outer tube wall (13) surrounding outside of the annular groove is formed, so as to make the annular groove form the annular waterway (112), wherein the outer tube wall (13) surrounds the annular groove by using a welding manner. Specifically, the welding manner can be gas welding, resistance welding, arc welding, induction welding and laser welding, butt welding or seed welding, and the present disclosure is not limited thereto.

At a fifth step (S5), the drilling manner is used to drill the outer tube wall (13) to form the outlet (131).

At a sixth step (S6), after the outlet (131) is formed, the welding manner is used to form the outlet pipe (14) at periphery of the outlet (131). Specifically, the welding manner can be gas welding, resistance welding, arc welding, induction welding and laser welding, butt welding or seed welding, and the present disclosure is not limited thereto. Further, after the outlet (131) is formed, an outlet pipe (14) is formed on the outlet (131) by using the laser welding, and thus the mixed water output from the outlet (131) can flow outside via the outlet pipe (14). Also refer to FIG. 9 and FIG. 10, and the outlet pipe (14) disposed at outside of the outlet (131) can be any shape, for example, a cycle or flat shape, and the present disclosure is not limited thereto. It is noted that, the shape of the outlet pipe (14) do not affect the implementation of the present disclosure while the outlet pipe (14) can successfully output the mixed water of the cold water from the first waterway (121) and the hot water from the second waterway (122).

At a seventh step (S7), a surface polishing process is formed on the main body (11), the outer tube wall (13) and the outlet pipe (14) after the outlet pipe (14) is formed, so as to polish the surfaces of the main body (11), the outer tube wall (13) and the outlet pipe (14).

Further, after the a surface polishing process is performed, the manufacturing method for manufacturing the faucet structure with the valve structure further comprises a step of disposing the valve core (21) having the handle core (211) in the first accommodating space (111). Refer to FIG. 5 and FIG. 9 again, the main body (11) of the valve structure (1) further has at least two positioning holes (116), and the positioning holes (116) are exposed to the first accommodating space (111), and he valve core (21) further has two positioning parts to engage into the positioning holes (116). By engaging the two positioning parts into the positioning holes (116), the valve core (21) can be installed in the first accommodating space (111) of the valve structure (1). Further, the handle core (211) can adjust mixing ratio of the cold water from the first waterway (121) and the hot water from the second waterway (122), and then the mixed water of the cold water and the hot water will be output by the outlet pipe (14).

Further, the manufacturing method for manufacturing the faucet structure with the valve structure further comprises a step for making the handle cover (22) with a handle (221) be sleeved on the handle core (211) of the valve core (21). Refer to FIG. 10, and the handle cover (22) is sleeved on the handle core (211) of the valve core (21), so as to control the handle core (211). Therefore, the mixing ratio of the cold water from the first waterway (121) and the hot water from the second waterway (122) can be adjusted. The handle cover (22) is extended to form a handle (221), and thus the user can easily control the handle cover (22) and the valve core (21) by operating the handle (221).

According to the descriptions of the embodiments, compared to the prior art, the faucet structure with the valve structure and the manufacturing method for manufacturing the same of the present disclosure has the following advantages.

In the present disclosure, the main body is formed with the cold cold waterway, the hot waterway, the mixing waterway therein by using a drilling manner, such that the three waterways and the main body made of stainless steel, copper, plastic steel, alloy or ceramic, are formed integrally in a valve structure. Then, an outlet is disposed to be connected to an annular waterway surrounding the main body, and the annular waterway outputs water to the outlet. Thus, it effectively solves the problems of water seepage caused by the tolerance between components or the long-term use of the valve core, and achieves the main advantages of effectively saving water by avoiding water seepage, and eliminating the need for gaskets to avoid poor sealing after aging.

To sum up, the faucet structure with the valve structure and the manufacturing method for manufacturing the same can indeed achieve the expected use effect by the above disclosed embodiments, and the present disclosure has not been disclosed before the application. Sincerely, it has fully complied with the provisions and requirements of the Patent Law, and the Applicant earnestly requests for review and approval of the present disclosure.

While the present disclosure has been described by way of example and in terms of preferred embodiment, it is to be understood that the present disclosure is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A manufacturing method for manufacturing a faucet structure with a valve structure,
    wherein the faucet structure with the valve structure comprises the valve structure, a valve core and a handle cover, and
    the valve structure comprises a main body, a waterway assembly, an outer tube wall and an outlet pipe; the main body has a first accommodating space, an annular waterway and an inner tube wall, wherein the first accommodating space is formed at and opened to an end of the main body, the annular waterway surrounds outside the first accommodating space, and the inner tube wall is formed between the annular waterway and the first accommodating space; the waterway assembly is disposed in the main body, and has a first waterway, a second waterway, a first mixing waterway and second mixing waterway, wherein the first waterway, the second waterway and the first mixing waterway are exposed to the first accommodating space, and the second mixing waterway is connected to the first mixing waterway and annular waterway; the outer tube wall is surrounding outside of the annular waterway, and has an outlet which is connected to the annular waterway and opened to the outer tube wall; the outlet pipe is disposed at the outlet;
    the valve core is disposed in the first accommodating space of the valve structure, wherein an end of the valve core away from the valve structure has a handle core;

the handle cover is sleeved on the handle core of the valve core;

the manufacturing method for manufacturing the faucet structure with the valve structure at least comprising:

a first step: using a turning and milling manner to form the first accommodating space at the end of the main body, and to form an annular groove outside the first accommodating space, wherein the inner tube wall is formed between the annular groove and the first accommodating space;

a second step: forming the waterway assembly on a direction extending away from the first accommodating space, and using a drilling manner to drill the waterway assembly to form the first waterway, the second waterway and the first mixing waterway, such that the first waterway, the second waterway and the first mixing waterway are exposed to the first accommodating space;

a third step: using the drilling manner to drill the waterway assembly to form the second mixing waterway on a direction which the annular groove faces to the first mixing waterway, wherein the second mixing waterway is communicative to the first mixing waterway;

a fourth step: forming the outer tube wall surrounding outside of the annular groove, so as to make the annular groove form the annular waterway, characterized in that at the fourth step, the outer tube wall surrounds the annular groove by using a welding manner; and a fifth step: using the drilling manner to drill the outer tube wall to form the outlet;

a sixth step: using the welding manner to form the outlet pipe at periphery of the outlet after the outlet is formed; and a seventh step: performing a surface polishing process on the main body, the outer tube wall and the outlet pipe after the outlet pipe is formed;

wherein, at the fourth step, before the outer tube wall is formed: forming a first tube way at an end of the first waterway away from the first accommodating space, wherein the first tube way is connectable to a first external water source; and forming a second tube way at an end of the second waterway away from the first accommodating space, wherein the second tube way is connectable to a second external water source; and wherein, at the fourth step, before the outer tube wall is formed: forming a second accommodating space which is located at and opened to another end of the main body away from the first accommodating space.

2. The manufacturing method for manufacturing the faucet structure with the valve structure of claim 1, wherein the turning and milling manner is to use a computer numerical control (CNC) turning and milling device to implement lathing and milling.

3. The manufacturing method for manufacturing the faucet structure with the valve structure of claim 1, wherein the first waterway, the second waterway and the first mixing waterway are arranged in a triangle in the first accommodating space.

4. The manufacturing method for manufacturing the faucet structure with the valve structure of claim 1, wherein the first tube way and the second tube way are disposed in the second accommodating space.

5. The manufacturing method for manufacturing the faucet structure with the valve structure of claim 1, wherein the outlet pipe is formed at the outlet by using the welding manner.

6. The manufacturing method for manufacturing the faucet structure with the valve structure of claim 5, wherein at the seventh step, after the surface polishing process is performed:

disposing the valve core having the handle core in the first accommodating space.

7. The manufacturing method for manufacturing the faucet structure with the valve structure of claim 6, wherein the handle cover with a handle is sleeved on the handle core of the valve core.

8. The manufacturing method for manufacturing the faucet structure with the valve structure of claim 1, wherein the valve core further has two positioning parts to engage into the positioning holes.

9. The manufacturing method for manufacturing the faucet structure with the valve structure of claim 8, wherein the handle cover is extended to form a handle.

* * * * *